US010556630B1

(12) United States Patent
Bingham et al.

(10) Patent No.: US 10,556,630 B1
(45) Date of Patent: Feb. 11, 2020

(54) FRICTION DRIVE SYSTEM AND METHODS FOR USE (71) Applicant: X Development LLC, Mountain View, CA (US)

(72) Inventors: Jeffrey Bingham, Mountain View, CA (US); Ben Berkowitz, Mountain View, CA (US); Benjamin Holson, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 254 days.

(21) Appl. No.: 15/196,090

(22) Filed: Jun. 29, 2016

(51) Int. Cl.
B62D 37/00 (2006.01)
B62D 61/00 (2006.01)

(52) U.S. Cl.
CPC .............. B62D 37/00 (2013.01); B62D 61/00 (2013.01); Y10S 901/01 (2013.01)

(58) Field of Classification Search
CPC ........ B62D 37/00; B62D 61/00; Y10S 901/01
USPC .......................................................... 701/36
See application file for complete search history.

(56) References Cited

U.S. PATENT DOCUMENTS

| 7,789,175 | B2 | | 9/2010 | Tobey et al. | |
|---|---|---|---|---|---|
| 8,083,013 | B2 | | 12/2011 | Bewley et al. | |
| 8,306,664 | B1 | * | 11/2012 | Wiley | B25J 5/007 280/304 |
| 8,788,096 | B1 | * | 7/2014 | Sokol | B25J 5/007 280/298 |
| 9,020,639 | B2 | * | 4/2015 | Bewley | B25J 5/005 700/258 |
| 9,428,019 | B1 | * | 8/2016 | Muhlrad | B60F 3/0007 |
| 9,505,132 | B1 | * | 11/2016 | Bingham | B25J 9/1692 |
| 9,759,267 | B2 | * | 9/2017 | Wiley | F16D 7/027 |
| 9,789,920 | B2 | * | 10/2017 | Hurst | B62D 57/032 |
| 9,863,790 | B1 | * | 1/2018 | Rivas | G01D 5/3473 |
| 9,889,562 | B1 | * | 2/2018 | Rembisz | B25J 9/1638 |
| 9,908,573 | B2 | * | 3/2018 | Wiley | B62D 61/12 |
| 9,975,258 | B2 | * | 5/2018 | Wiley | B25J 19/0054 |
| 10,058,999 | B2 | * | 8/2018 | Lee | B25J 9/1666 |
| 10,173,738 | B2 | * | 1/2019 | Schnapp | B62D 37/04 |
| 10,189,342 | B2 | * | 1/2019 | Bewley | B60K 7/0007 |
| 2006/0293808 | A1 | | 12/2006 | Qian | |
| 2007/0259602 | A1 | * | 11/2007 | Dunham | A63H 17/004 446/466 |
| 2008/0105481 | A1 | * | 5/2008 | Hutcheson | B25J 5/007 180/209 |

(Continued)

Primary Examiner — Angelina Shudy
(74) Attorney, Agent, or Firm — McDonnell Boehnen Hulbert & Berghoff LLP (57) ABSTRACT An example implementation includes a robotic system including a first wheel and a second wheel configured to rotate about a first axis. Each wheel of the first wheel and the second wheel includes a contact surface and a motor coupled to a rotatable component. Each motor is configured to rotate the rotatable component about a respective second axis. The rotatable component is frictionally engaged with the contact surface such that a rotation of the rotatable component about the respective second axis is translated to a rotation of the wheel about the first axis. The robotic system further includes a controller configured to operate the motor of the first wheel and the motor of the second wheel in order to cause the robotic system to maintain its balance and navigate within an environment based on data received from one or more sensors.

15 Claims, 6 Drawing Sheets (56) References Cited

U.S. PATENT DOCUMENTS

| | | | |
|---|---|---|---|
| 2008/0230285 A1* | 9/2008 | Bewley | B62D 37/00 180/8.4 |
| 2009/0014223 A1* | 1/2009 | Jones | B60K 17/16 180/65.8 |
| 2010/0263948 A1* | 10/2010 | Couture | B25J 5/005 180/8.2 |
| 2010/0317481 A1* | 12/2010 | Gleasman | F16H 48/29 475/226 |
| 2012/0185087 A1 | 7/2012 | Kang | |
| 2012/0215355 A1* | 8/2012 | Bewley | B25J 5/005 700/258 |
| 2014/0039676 A1* | 2/2014 | Fernando | G05D 1/024 700/253 |
| 2016/0059411 A1* | 3/2016 | Richter | B25J 9/162 701/23 |

* cited by examiner

FRICTION DRIVE SYSTEM AND METHODS FOR USE

BACKGROUND

As technology advances, various types of robotic systems are being created for performing a variety of functions that may assist users. Robotic systems may be used for applications involving material handling, transportation, cleaning, assembly, and dispensing, among others. Over time, the manner in which these robotic systems operate is becoming more intelligent, efficient, and intuitive. As robotic systems become increasingly prevalent in numerous aspects of modern life, the desire for efficient robotic systems becomes apparent. Therefore, a demand for efficient and safe robotic systems has helped open up a field of innovation in actuators, movement, sensing techniques, as well as component design and assembly.

SUMMARY

The present disclosure generally relates to robotic systems that may be utilized in various residential and commercial applications such as cleaning, organization, or various other tasks. Such a robotic system may include various components such as sensors, cameras, manipulators, and/or robotic arms. Additionally, the robotic system may be remotely or autonomously operated to perform various tasks. In one particular example, the robotic system may be a balancing robotic system supported and moved by wheels. In some scenarios, the balancing robotic system may be configured to traverse from one location to another in the environment to complete a variety of tasks. In such an example, the robotic system may encounter obstacles along the way. To maintain balance when traversing such obstacles, the wheels may be relatively large in relation to the size of the robotic system. However, the motor to wheel transmission should have very low backlash to maintain the balance of the robotic system. In traditional configurations, the larger the wheel, the more gear reduction required, which leads to an undesired increased backlash. Therefore, an improved drive system for driving a wheel of a balancing robotic system may be desired.

A first example implementation includes a robotic system having (i) a body; (ii) one or more sensors; (iii) a first wheel and a second wheel coupled to the body, wherein both the first wheel and the second wheel are configured to rotate about a first axis, and wherein each wheel of the first wheel and the second wheel comprises: (a) a contact surface; and (b) a motor coupled to a rotatable component, wherein the motor is configured to rotate the rotatable component about a respective second axis, and wherein the rotatable component is frictionally engaged with the contact surface such that a rotation of the rotatable component about the respective second axis is translated to a rotation of the wheel about the first axis; and (iv) a controller configured to operate the motor of the first wheel and the motor of the second wheel in order to cause the robotic system to maintain balance and navigate within an environment based on data received from the one or more sensors.

A second example implementation includes a system comprising (i) a wheel including a contact surface, wherein the wheel is configured to rotate about a first axis; and (ii) a motor coupled to a rotatable component, wherein the motor is configured to rotate the rotatable component about a second axis, and wherein the rotatable component is frictionally engaged with the contact surface such that a rotation of the rotatable component about the second axis is translated to a rotation of the wheel about the first axis.

A third example implementation includes a method comprising (i) determining, by a control system of a robotic system, a target position of the robotic system; and (ii) operating, by the control system of the robotic system, a first wheel and a second wheel of the robotic system to cause the robotic system to navigate to the target position while maintaining balance, wherein each wheel of the first wheel and the second wheel comprises: (a) a contact surface; and (b) a motor coupled to a rotatable component, wherein the motor is configured to rotate the rotatable component, and wherein the rotatable component is frictionally engaged with the contact surface such that a rotation of the rotatable component is translated to a rotation of the wheel.

A fourth example implementation may include a system having means for performing operations in accordance with the third example implementation.

These as well as other aspects, advantages, and alternatives will become apparent to those of ordinary skill in the art by reading the following detailed description, with reference where appropriate to the accompanying drawings.

DETAILED DESCRIPTION

Example implementations are described herein. The words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. Thus, the aspects of the present disclosure, as generally described herein and illustrated in the figures, can be arranged, substituted, combined, separated, and designed in a wide variety of different configurations, all of which are contemplated herein. Further, unless otherwise noted, figures are not drawn to scale and are used for illustrative purposes only. Moreover, the figures are representational only and not all components are shown. For example, additional structural or restraining components might not be shown.

I. OVERVIEW

Robotic systems may be utilized in various residential and commercial applications such as cleaning, organization, or various other tasks. For example, a robotic system may include sensors, such as a camera, and manipulators, such as a robotic arm. Additionally, the robotic system may be remotely or autonomously operated to perform the various tasks. Various systems may be employed to control motion of such robotic systems. For example, the robotic system may be supported and moved by wheels. In such an example, a control system may control the wheels to move the robotic system from one location to another, and may further control on-board manipulators to perform the various tasks.

Within examples, a device is provided that includes a plurality of wheels coupled to a body in a given arrangement. The device, for example, may be a robotic system or any other vehicle/apparatus having the body supported by the plurality of wheels. In one particular example, the robotic system may be a balancing robotic system having two wheels. The balancing robotic system may include a control system configured to maintain its balance while moving throughout an environment.

In some scenarios, the balancing robotic system may be configured to traverse from one location to another in the environment to complete a variety of tasks. In such an example, the robotic system may encounter obstacles along the way. To maintain balance when traversing such obstacles, the wheels of the robotic system may be relatively large in relation to the overall size of the robotic system. However, the motor to wheel transmission should have very low backlash to maintain the balance of the robotic system. Typically, the larger the wheel, the more gear reduction required, which leads to an undesired increased backlash. Example implementations relate to an improved drive system for driving a wheel of a robotic system to provide a large gear reduction with very low backlash.

In one particular example, a drive system may include a rotatable component of a motor to directly drive the wheel of the robotic system by transmitting torque to the wheel through friction. In particular, the wheel may include a contact surface, and the rotatable component of the motor is arranged to be frictionally engaged with the contact surface such that a rotation of the rotatable component is translated to a rotation of the wheel. Using the balancing robotic system described above, both wheels may include such a drive system. In one example, the rotatable component of the motor may include the motor hub or shaft. In another example, the rotatable component of the motor may include a gear coupled to the motor shaft. Further, in one example the rotatable component may be frictionally engaged with the outer diameter of the wheel. In another example, the rotatable component may be frictionally engaged with a secondary track on the wheel. Other examples are discussed in additional detail below. Such a configuration may provide a large gear ratio with little to no backlash in a cost effective manner. Using this configuration, the robotic system may further include a controller configured to operate the motor of the first wheel and the motor of the second wheel in order to cause the robotic system to maintain its balance and navigate within an environment based on data received from one or more sensors of the robotic system.

It is noted that the scenarios and examples above are for illustrative purposes only. Other scenarios, examples, and configurations are possible as well and are described in greater detail within exemplary implementations herein. Additionally, many parameters of the implementations herein may be varied according to various applications. For example, methods herein may be implemented by various devices having various numbers, arrangements, and/or combinations of components.

II. EXAMPLE ROBOTIC SYSTEMS

Figure 1:
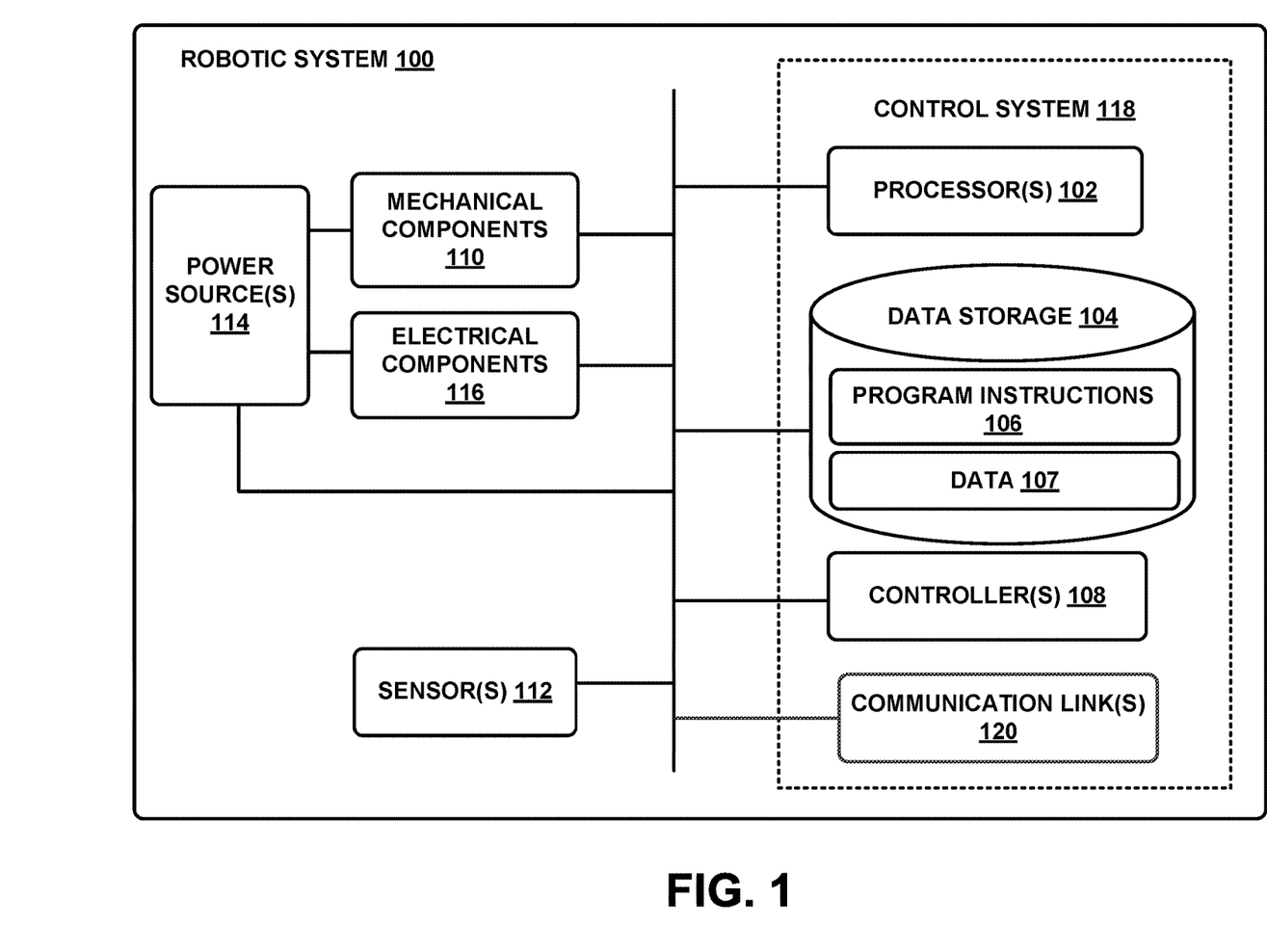
FIG. 1 illustrates a configuration of a robotic system, according to an example implementation.

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement. Furthermore, the robotic system 100 may also be referred to as a robot, robotic system, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, electrical components 116, and communication link(s) 120. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, electrical components 116, and/or communication links 120.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, the communication link(s) 120, and/or a user of the robotic system 100. In some implementations, the controller 108 may be a purpose-built embedded device for performing specific operations with one or more subsystems of the robotic system 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

In some implementations, the control system 118 of robotic system 100 may also include communication link(s) 120 configured to send and/or receive information. The communication link(s) 120 may transmit data indicating the state of the various components of the robotic system 100. For example, information read by sensor(s) 112 may be transmitted via the communication link(s) 120 to a separate device. Other diagnostic information indicating the integrity or health of the power source(s) 114, mechanical components 110, electrical components 116, processor(s) 102, data storage 104, and/or controller 108 may be transmitted via the communication link(s) 120 to an external communication device.

In some implementations, the robotic system 100 may receive information at the communication link(s) 120 that is then processed by the processor(s) 102. The received information may indicate data that is accessible by the processor(s) 102 during execution of the program instructions 106. Further, the received information may change aspects of the controller(s) 108 that may affect the behavior of the mechanical components 114 or the electrical components 116. In some cases, the received information may indicate a query requesting a particular piece of information (e.g., the operational state of one or more of the components of the robotic system 100). The processor(s) 102 may subsequently transmit the particular piece of information back out the communication link(s) 120.

In some cases, the communication link(s) 120 may include a wired connection. The robotic system 100 may include one or more ports to interface the communication link(s) 120 to an external device. The communication link(s) 120 may include, in addition to or alternatively to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, Bluetooth, or a near-field communication (NFC) device.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular set of one or more tasks.

The input to control system 118 may be received via the communication link(s) 120. Based on this input, the control system 118 may perform operations to cause the robotic system 100 to perform the one or more tasks.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely. Communication link(s) 120 may be used at least in part to carry out the remote communication.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors.

In one example, the robotic system 100 may include an encoder coupled to an electric motor and/or a wheel of the robotic system 100 and configured to provide data indicative of motion and/or orientation of the electric motor and/or the wheel. For example, the encoder may include a rotary encoder, a shaft encoder, or any other electro-mechanical device configured to convert an angular position/motion of a shaft of the electric motor to an analog or digital signal (e.g., the data, etc.). Various implementations are possible for the encoder such as mechanical (e.g., metal disc containing a set of concentric rings of openings), optical (e.g., glass/plastic with transparent and opaque areas), magnetic (e.g., disc that includes a series of magnetic poles), capacitive (e.g., asymmetrical shaped disc rotated within the encoder to adjust capacitance between two electrodes), or any other implementation.

In some examples, the data provided by the encoder may indicate a change in a position (e.g., orientation) of, respectively, the electric motor. Further, for example, the encoder may provide a signal (e.g., index pulse, etc.) indicative of the electric motor being at a particular orientation. Further, in some examples, the data provided by the encoder may be processed by the robotic system 100 to determine speeds of the electric motor. For example, a time measurement may be obtained by the robotic system 100 in addition to the data from the encoder to determine the speed of the electric motor.

Accordingly, in some examples, the encoder may include an incremental encoder configured to provide the data indicative of a change in the orientation of the electric motor. In these examples, the robotic system 100 may cause the electric motor to rotate a given wheel of the robotic system 100 until the signal (e.g., index pulse, etc.) of the encoder is detected to determine the particular orientations of the electric motor.

Additionally or alternatively, in some examples, the encoder may include an absolute encoder configured to provide the data. The absolute encoder, for example, may be configured to detect motion/change in orientations of the electric motor even if the absolute encoder is not provided with power. In these examples, the encoder may provide the data indicative of the orientations of the electric motor without the robotic system 100 rotating a given wheel until the signal (e.g., index pulse) is received from the encoder.

Accordingly, in some examples, the data provided by the encoder may be conditioned as inputs to a control loop (e.g., the control system 118) and outputs of the control loop may be conditioned as inputs to the power source(s) 114 to cause the motion of the robotic system 100.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic system 100, such as on the body and/or on one or more of the appendages, among other examples.

On its body, the robotic system 100 may carry a load, such as a type of cargo that is to be transported. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible.

Figure 2:
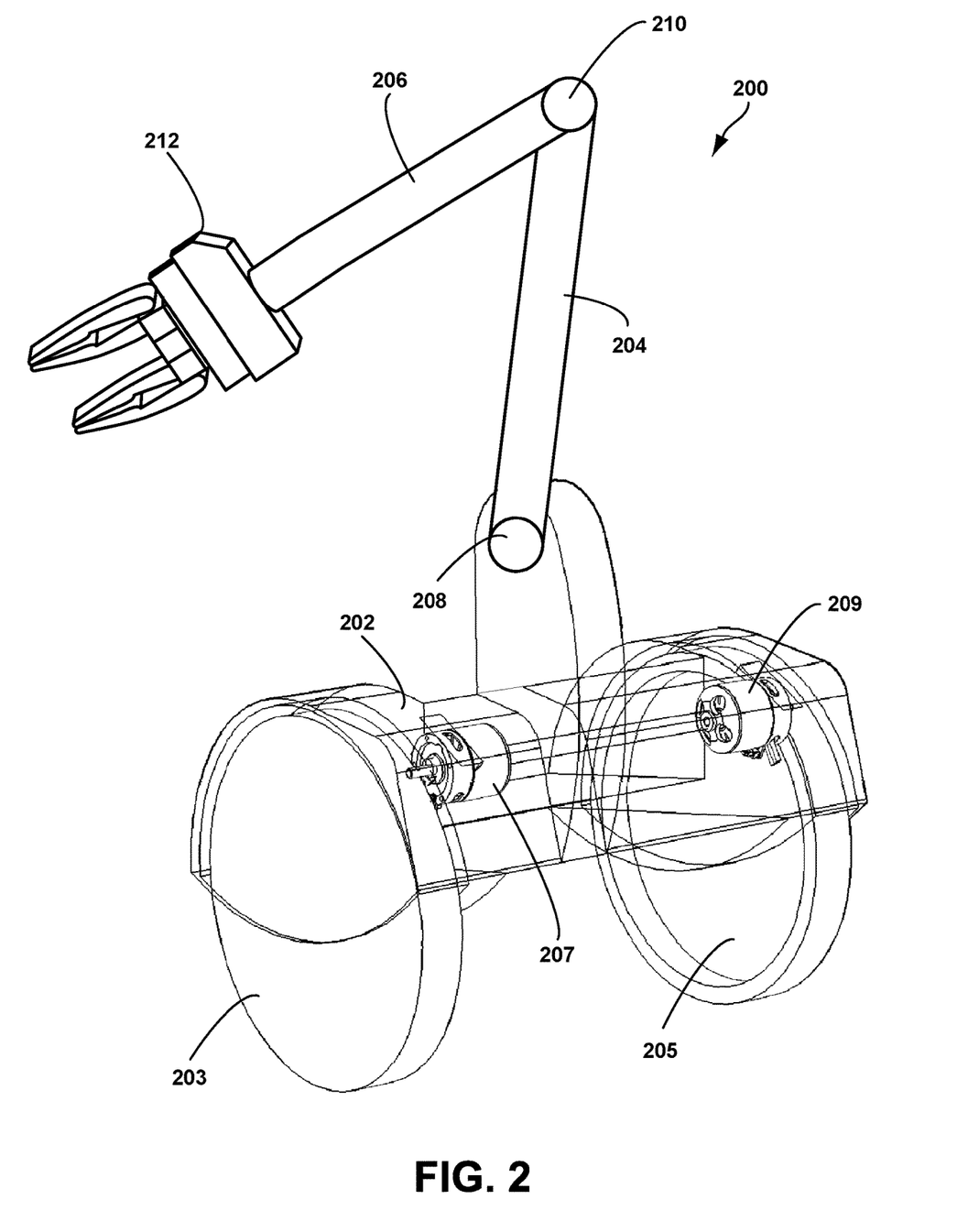
FIG. 2 illustrates a robotic system, according to an example implementation.

FIG. 2 illustrates an example robotic system 200. Robotic system 200 may be used to carry out the operations described herein. The robotic system 200 may correspond to the robotic system 100 shown in FIG. 1, and may be configured to perform some of the implementations described herein. Thus, the robotic system 200 may include one or more of mechanical components 110, sensor(s) 112, power source(s) 114, electrical components 116, and/or control system 118.

A robotic arm of robotic system 200 may be mounted on or connected to a body 202. The body 202 may be a mobile base configured to move about an environment using wheels 203, 205. As shown in FIG. 2, the wheels 203, 205 are coupled to the body, and the wheels 203, 205 are configured to rotate about a shared first axis. Further, both wheels 203, 205 may be driven by motors 207, 209, respectively. Each motor 207, 209 includes a rotatable component that rotates about a respective second axis. The second axis may be parallel to the first axis, as shown in FIG. 2, although the second axis may also be arranged in a different configuration as described in more detail below. The respective second axis for each wheel 203, 205 may be the same, as shown in FIG. 2, or each wheel 203, 205 could have a different respective second axis.

The rotatable component of each motor 207, 209 may be frictionally engaged with a contact surface of the corresponding wheel 203, 205 such that a rotation of the rotatable component about the second axis is translated to a rotation of the wheels 203, 205 about the first axis. The specific arrangement of the motors 207, 209 with respect to the wheels 203, 205 is discussed in additional detail below. In the particular example shown in FIG. 2, the body may include cowls to protect the motors 207, 209 from the environment in which the robotic system 200 operates. The control system 118 may be configured to independently control each of the motors 207, 209 to thereby drive each of the wheels 203, 205.

The robotic arm may include a control arm. The control arm may include a variety of linkages and degrees of freedom depending on the particular use case. In one example, the control arm may include six degrees of freedom (pan, pitch, pitch, pitch, yaw, and roll). In another example, as shown in FIG. 2, the control arm may include first linkage 204 and second linkage 206 connected to robotic system 200. A first end of the first linkage 204 may be connected to the body 202 of the robotic system 200 through rotational joint 208. A first end of the second linkage 206 may be connected to a second end of the first linkage 204 through rotational joint 210. Rotational joint 208 may be actuated to control a pitch of the first linkage 204 as well as the pitch of the control arm (first linkage 204 and second linkage 206) as a whole. Rotational joint 210 may be actuated to control a pitch of the second linkage 206. The rotational joints 208 and 210 may be purely rotational joints configured to rotate the first linkage 204 and the second linkage 206, respectively, in or parallel to a single plane of rotation. The control arm may also be referred to as an actuated control arm when it is actuated and/or configured to be actuated by at least one joint.

The robotic arm may additionally include an end effector 212. The end effector 212 may be at least one of a plurality of available end effectors including pinch grippers, suction grippers, forks/pitchforks, fork/pitchfork-like end effectors, shovels, shovel-like end effectors, excavator buckets, sweeping tools, pans, polishing tools, cleaning tools, a camera, and a tablet computer. The end effector 212 may be modular, allowing different types of end effectors to be attached depending on the particular task performed by the robotic system 212. FIG. 2 illustrates the end effector 212 comprising a gripper. In other implementations, the end effector 212 may comprise two or more different end effectors, each useful for a particular task that the robotic system 200 is expected to perform.

As illustrated in FIG. 2, the robotic system 200 configured to move about an environment using wheels 203, 205. The arrangement of the wheels 203, 205 and the motors 207, 209 makes the diameter of the wheels 203, 205 independent of the sizing of the motors 207, 209. As such, the particular diameter of the wheels 203, 205 may be chosen based on an expected operating environment of robotic system 200. For example, when working inside a house with level floors and no expected large obstacles, robotic system 200 may utilize a smaller diameter for the wheels 203, 205. When the robotic system 200 works outside, for example, to remove sticks, stones, or other debris from a front yard and/or a back yard of a house, the robotic system 200 may utilize a larger diameter for wheels 203, 205.

The robotic system 200 may be modularized to allow the wheels 203, 205 to be swapped out based on the environment the robotic system 200 is expected to work in. The process of swapping the wheels may be carried out by a docking station configured to detach a first (presently attached means) of movement (e.g., a first pair of wheels having a first diameter) and attach a second means of movement (e.g., a second pair of wheels having a second diameter). In such an example, the height of the motors 207, 209 may be adjustable such that the rotatable component of each motor 207, 209 may be moved up or down so that regardless of the diameter of the wheel, the rotatable component contacts the wheel. For example, the motors 207, 209 may be mounted on a sliding mechanism attached to the body, such that the height of the motors 207, 209 can be adjusted based on the diameter of the wheel. In another example, the height of the motors 207, 209 may be automatically adjusted by the control system 118 based on an input of the diameter of the wheel.

In yet another example, the process of swapping the wheels may be carried out by a docking station configured to detach a first (presently attached means) of movement (e.g., a first pair of wheels having a first tread) and attach a second means of movement (e.g., a second pair of wheels having a second tread). For example, when working inside a house with level floors and no expected large obstacles, robotic system 200 may utilize wheels with less tread. When the robotic system 200 works outside, the robotic system 200 may utilize wheels with a greater tread depth. Other examples are possible as well.

The control system 118 may be configured to operate the motors 207, 209 in order to cause the robotic system 200 to maintain its balance and navigate within an environment based on data received from the sensor(s) 112. In one example, the control system 118 maintains the balance of the robotic system 200 by (i) determining a position of a center of mass of the robotic system 200, (ii) determining a position of the first wheel 203 and the second wheel 205 of the robotic system 200, (iii) determining that the position of the center of mass of the robotic system 200 is outside of a polygon defined by the determined position of the first wheel 203 and the second wheel 205, and (iv) adjusting a rotational speed of the rotatable component of the motor 207 of the first wheel 203 and/or the rotatable component of the motor 209 of the second wheel 205 such that the center of mass of the robotic system 200 is moved inside of the polygon. In another example, the control system 118 may be further configured to adjust the position of the robotic arm to adjust the position of the center of mass of the robotic system 200 to aid in balancing.

In another example, the control system 118 maintains the balance of the robotic system 200 by (i) determining a position of a center of mass of the robotic system 200, (ii) determining a first contact point of the first wheel 203 of the robotic system 200 on a ground surface and a second contact point of the second wheel 205 of the robotic system 200 on the ground surface, (iii) determining a distance from a projection of the center of mass onto the ground surface from a line defined by the first contact point and the second contact point, and (iv) adjusting a rotational speed of the rotatable component of the motor 207 of the first wheel 203 and/or the rotatable component of the motor 209 of the second wheel 205 such that a velocity of the given wheel is driven to a given target. In such an example, the velocity of the given wheel may be the rotational and/or the linear velocity. Further, the control system 118 may further determine the rate of change of the distance between the projection of the center of mass onto the ground surface and the line defined by the first contact point and the second contact point, and adjust the rotational speed of the rotatable component further based on that determined rate of change.

In yet another example, the control system 118 maintains the balance of the robotic system 200 by defining an adjustment of the wheel velocity proportional to the angle measured by the line connecting the center-of-mass of the robotic system 200 with the axis of rotation of the wheels 203, 205 and the vertical defined by the direction of gravity. In such an example, as that angle defined above increases, the adjustment of the wheel velocity also increases to maintain balance of the robotic system 200.

Further, the one or more sensor(s) 112 may include a sensor you could make an estimator of slip based on the expected dynamics of the system and the torque you are inputting and if you see that reflected in the wheel motion.

III. EXAMPLE DRIVE SYSTEMS

Implementations described herein relate to a drive system for a robotic system. As discussed above, in some scenarios, the robotic system may be configured to traverse from one location to another in the environment to complete a variety of tasks. In such an example, the robotic system may encounter obstacles along the way. To maintain balance when traversing such obstacles, the wheels of the robotic system may be relatively large in relation to the overall size of the robotic system. Further, the drive system should provide high torque at low speed. However, the motor to wheel transmission should have very low backlash to maintain the balance of the robotic system. Typically, the larger the wheel, the more gear reduction required, which leads to an undesired increased backlash. The drive system described herein utilizes the wheel itself as a gear, and a friction drive from the motor shaft to the wheel drives the wheel. Such a drive system may be accomplished in a variety of configurations, as shown in FIGS. 3A-3F.

The drive system 300 shown in FIGS. 3A-3F may be present in the robotic systems 100, 200 described above in relation to FIGS. 1 and 2. As such, the drive systems 300 shown in FIGS. 3A-3F may be present in the first wheel 203 and the second wheel 205. The drive system in each wheel may be the same, or the drive system in the first wheel may have a different arrangement than the drive system in the second wheel.

Referring now to the Figures, FIGS. 3A-3F illustrates side cross-section views of various implementations of a drive system 300, according to an example implementation. As shown in FIGS. 3A-3F, the drive system 300 includes a wheel 302 configured to rotate about a first axis 304. The wheel 302 may correspond to the wheels 203, 205 described above in relation to FIG. 2. The wheel may include a contact surface 306. The drive system 300 may also include a motor 308 coupled to a rotatable component 310. The motor 308 may correspond to the motors 207, 209 described above in relation to FIG. 2. As used herein, a "contact surface" is any surface coupled to the wheel 302 that may be contacted by the rotatable component 310.

The rotatable component 310 may take a variety of forms. In one example, the rotatable component 310 comprises a motor pinion. In another example, the rotatable component 310 comprises the shaft of the motor 308. In another example, the rotatable component 310 comprises a gear, and the contact surface 306 of the wheel 302 comprises a complementary gear to receive the gear of the rotatable component 310. Other example implementations of the rotatable component 310 are possible as well.

The motor 308 may be configured to rotate the rotatable component 310 about a second axis 312. The rotatable component 310 is frictionally engaged with the contact surface 306 of the wheel 302 such that a rotation of the rotatable component 310 about the second axis 312 is translated to a rotation of the wheel 302 about the first axis 304. As used herein, "frictionally engaged" means that the rotatable component 310 is physically touching the contact surface 306 such that the friction between the rotatable component 310 and the contact surface 306 cause the rotation of the rotatable component 310 about the second axis 312 to be translated to a rotation of the wheel 302 about the first axis 304. In one particular example, the gear ratio of the wheel 302 to the rotatable component 310 may range from about 10:1 to about 30:1. Such a gear ratio may be advantageous for a robotic system to provide high torque and low speed to navigate through an environment with obstacles. Such a gear ratio may enable a robotic device to drive over obstacles such as sticks, rocks, wires, etc. with little to no backlash. Other ranges for the gear ratio are possible as well.

Figure 3A:
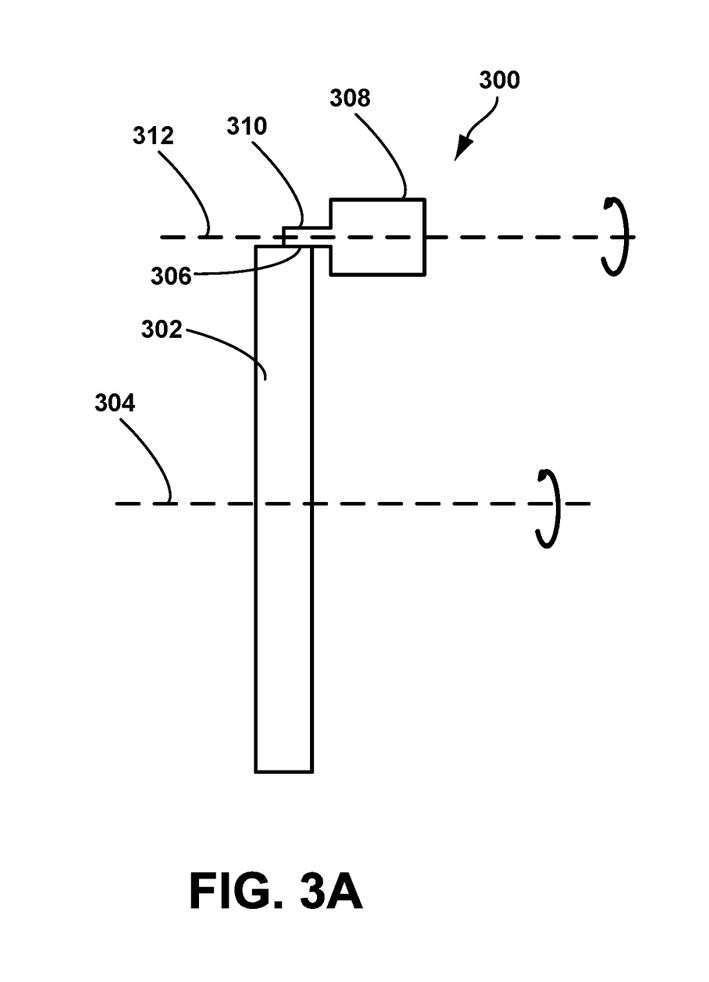
FIG. 3A illustrates a side cross-section view of a drive system, according to an example implementation.

In the implementation shown in FIG. 3A, the contact surface 306 comprises an outer diameter of the wheel 302. One or more of the contact surface 306 and the rotatable component 310 includes a rubber material to assisting in the frictional engagement of the contact surface 306 and the rotatable component 310.

Figure 3B:
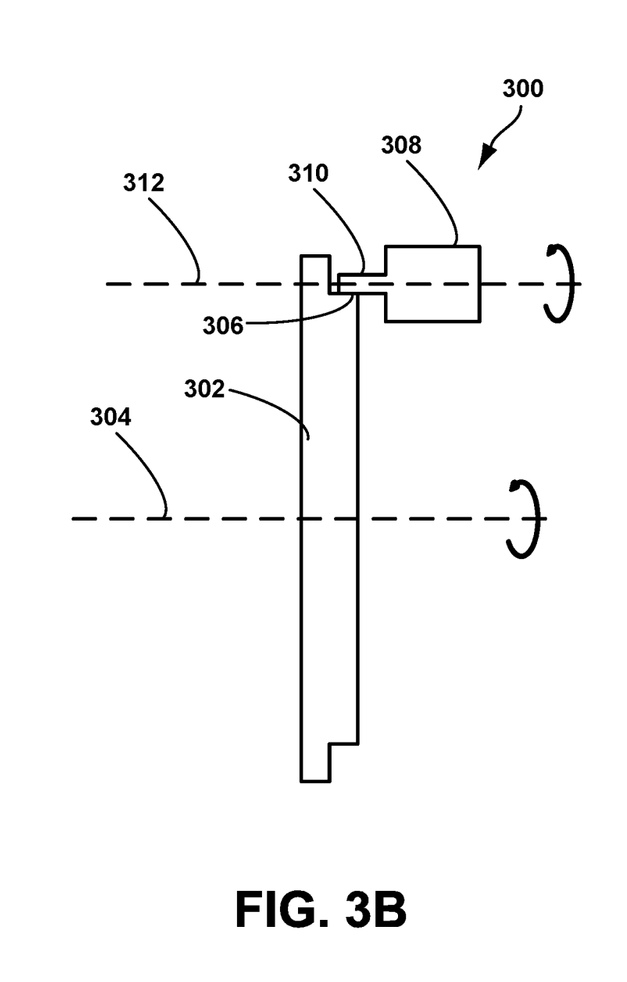
FIG. 3B illustrates a side cross-section view of another drive system, according to an example implementation.

In the implementation shown in FIG. 3B, the contact surface 306 comprises a recessed secondary track on the wheel 302. As shown in FIG. 3B, the recessed secondary track has a diameter that is less that the diameter of the wheel 302. The recessed secondary track may include a rubber material, or other frictionally engaging material to assist in the frictional engagement of the contact surface 306 and the rotatable component 310. The recessed secondary track may be advantageous in that it is protected from the elements of the environment in which the wheel 302 is operating. For example, if the wheel 302 is operating outside, the surface of the wheel may encounter water, mud, dirt, or other substances. By using a recessed secondary track as the contact surface 306, the contact surface 306 will not be exposed to those substances, which may enable an improved frictional engagement between the rotatable component 310 and the contact surface 306.

Figure 3C:
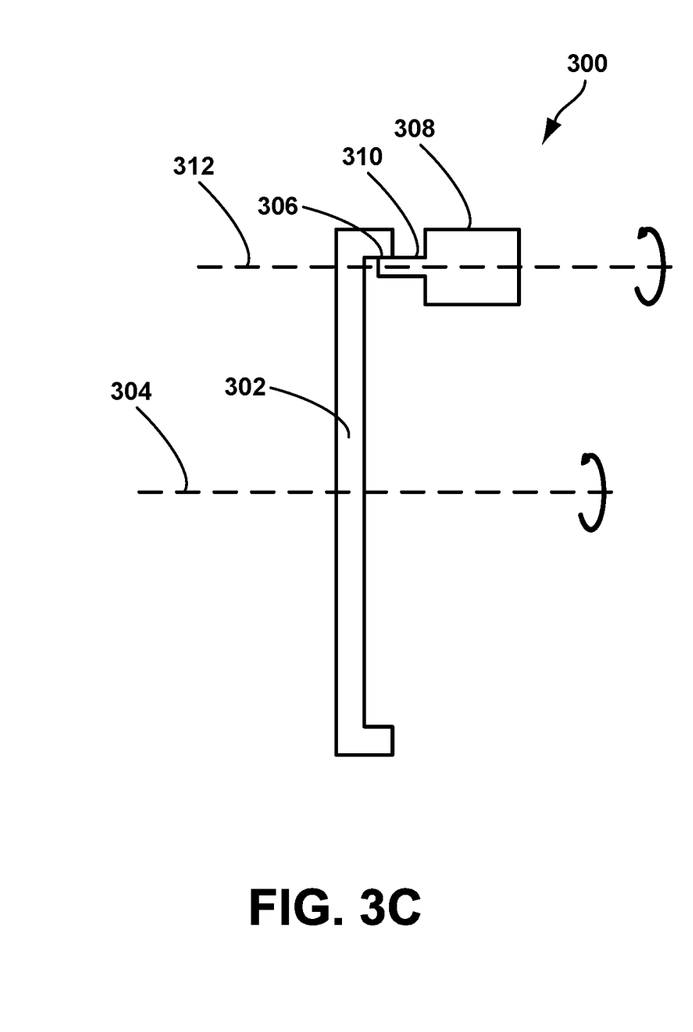
FIG. 3C illustrates a side cross-section view of another drive system, according to an example implementation.
Figure 3D:
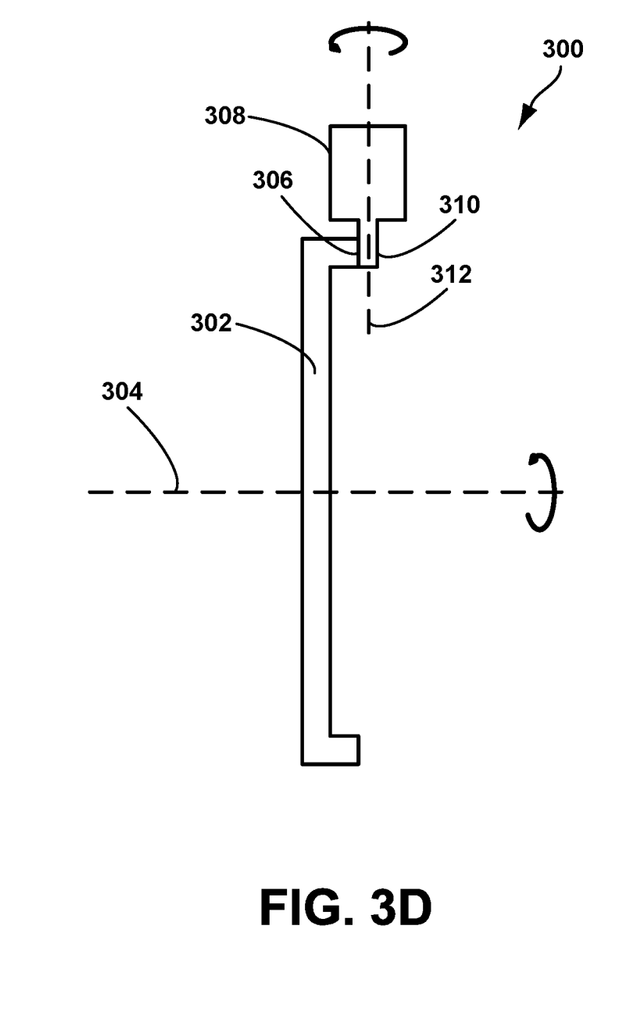
FIG. 3D illustrates a side cross-section view of another drive system, according to an example implementation.
Figure 3E:
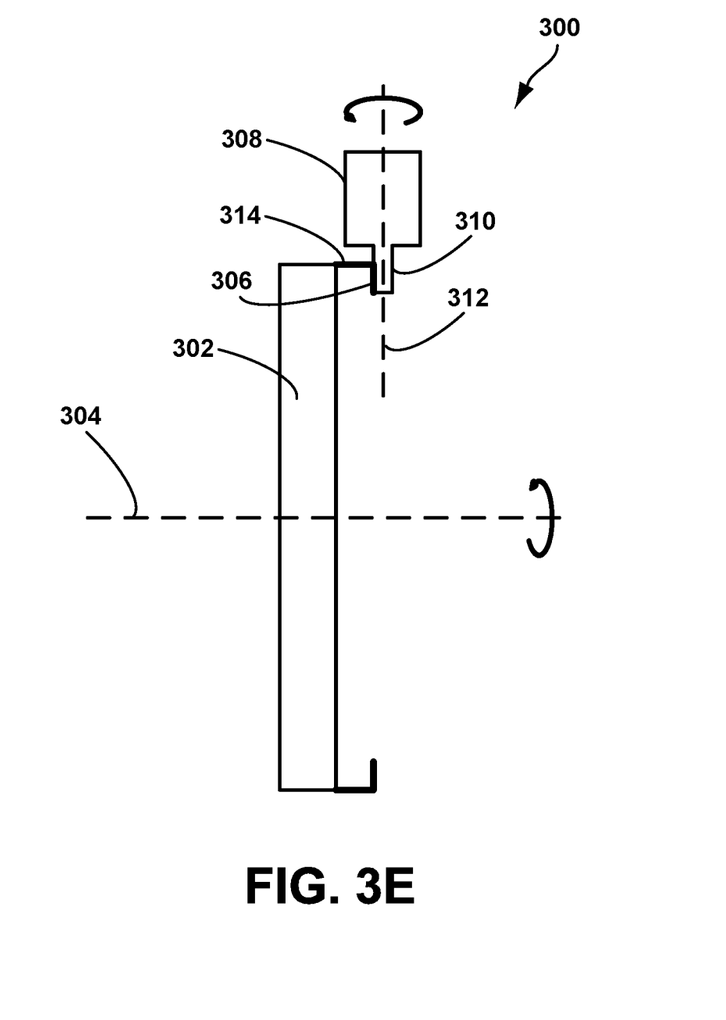
FIG. 3E illustrates a side cross-section view of another drive system, according to an example implementation.
Figure 3F:
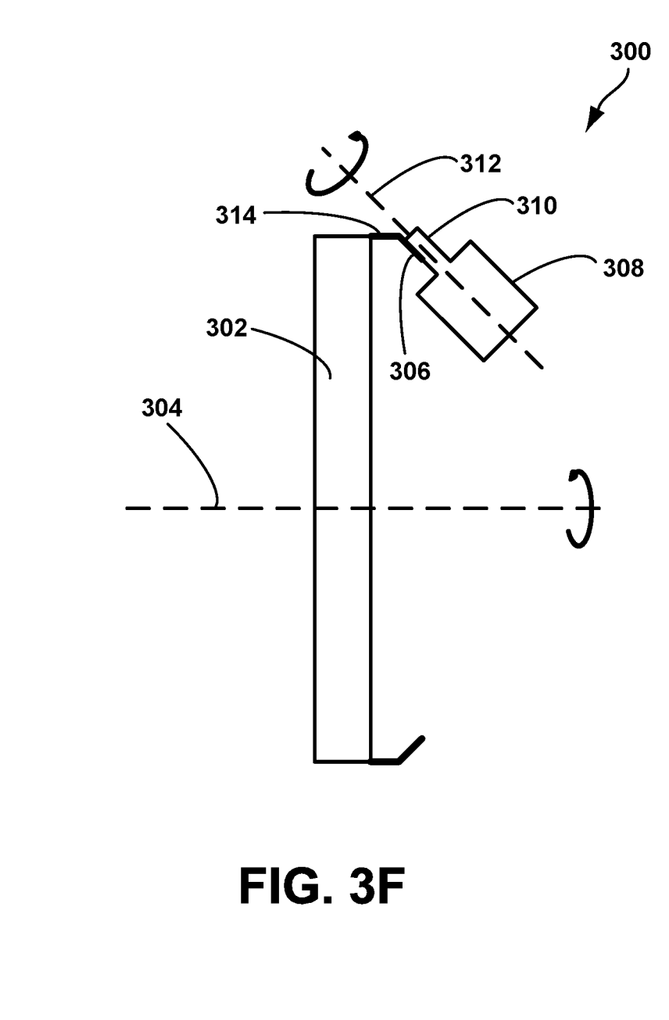
FIG. 3F illustrates a side cross-section view of another drive system, according to an example implementation.

In the implementation shown in FIG. 3C, the contact surface 306 comprises a track on an inner diameter of the wheel 302. Similar to the implementation shown in FIG. 3B, having the contact surface 306 on the inner diameter of the wheel 302 may protect the contact surface 306 from various substances in which the wheel 302 is operating. In the implementations shown in FIGS. 3A-3C, the second axis 312 is parallel to the first axis 304. However, as shown in FIGS. 3D-3F, that is not necessarily the case. In particular, as shown in FIG. 3D, the second axis 312 may be perpendicular to the first axis 304. Further, as shown in FIG. 3D, the contact surface 306 may comprise an outer rim of the wheel 302. Similar to the implementation shown in FIGS. 3B and 3C, having the contact surface 306 on the outer rim of the wheel 302 may protect the contact surface 306 from various substances in which the wheel 302 is operating. In addition, having the contact surface 306 on the outer rim of the wheel 302 may enable the motor 308 to be positioned within the body of the robotic system, thereby reducing the width of the robotic system.

In the implementation shown in FIG. 3E, the contact surface comprises an angled flange 314. As used here, the "angled flange" is an external ridge or rim extending from the wheel 302 having an angle with respect to the wheel surface. In particular, the angled flange 314 shown in FIG. 3ED is at a ninety-degree angle with respect to the surface of the wheel 302, such that the first axis 304 is perpendicular to the second axis 304. In the implementation shown in FIG. 3F, the angled flange 314 has an angle of approximately one hundred thirty five degrees, such that the first axis 304 and the second axis 312 intersect at an approximate forty-five degree angle. In yet another implementation, the angled flange 314 may be a one hundred eighty degree angle from the surface of the wheel 302 such that the first axis 304 is parallel to the second axis 312. The various configurations with the angled flange 314 may be advantageous depending on the particular requirements of fitting the motor 308 within the robotic system. Further, the angled flange 314 may be positioned within a body of the robotic device to protect the contact surface 306 from various substances in which the wheel 302 is operating. Other arrangements of the rotatable component 310 with respect to the wheel 302 are possible as well.

IV. EXAMPLE METHODS

Figure 4:
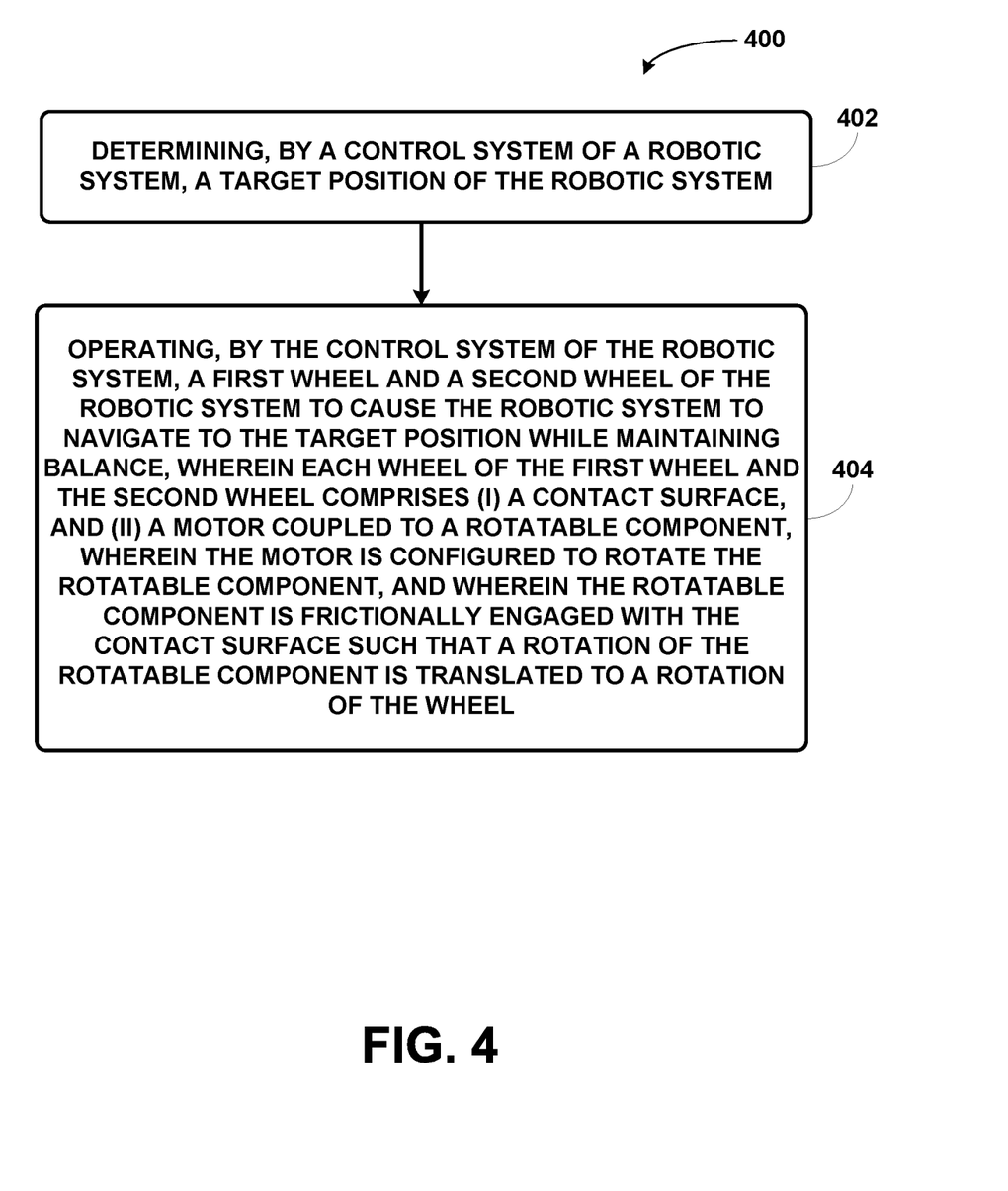
FIG. 4 is a flowchart of an example method, according to an example implementation.

FIG. 4 is a flowchart of a method 400, according to example implementations. The implementations may be carried out by one or more of the robotic systems as described above in relation to FIGS. 1-3F. Method 400 may include one or more operations, functions, or actions as illustrated by one or more of blocks 402-404. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other procedures and operations disclosed herein, the block diagram illustrates a possible implementation. In this regard, each block may represent a module, a segment, or a portion of program code, which includes one or more instructions executable by a processor or computing device for implementing specific logical operations. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device.

In addition, each block in FIG. 4 may represent circuitry that is wired to perform the specific logical operations.

At block 402, the method 400 includes determining, by a control system of a robotic system, a target position of the robotic system. In one example, the target position may coincide with an object in an environment of the robotic system. Within examples, an example robotic system is a mechanically operable mobile device with at least some functions automated by a control system of the robotic system. As a specific example, the robotic system may be a relatively small, mobile robotic system that is capable of transporting objects from one location to another within the environment.

In one example, determining the target position of the robotic system may include the robotic system receiving instructions to pick up an object at the target position. Within examples, instructions to pick up an object include any type of digital signal or information that is receivable by the control system of the robotic system. In some examples, the instructions may simply include a signal to pick up an object without other information identifying the object. In such examples, the control system of the robotic system may infer which object to pick up or otherwise identify the object based on the current positioning of the robotic system. The control system may also use predetermined guidelines regarding types of objects to be picked up. For instance, the robotic system may have predetermined guidelines to only pick up and move boxes. In other examples, the instructions may include information to help the control system identify the object to be picked up as well. For instance, the instructions may include the type of object (e.g., a box), a location of the object, or other types of identifying information (e.g., shape, size, color, identification numbers, etc.). In further examples, the instructions may also information indicating how to pick up the object. For instance, the instructions may indicate a pickup point and/or which side of the object to use to place the object on a platform of the robotic system.

In some examples, the target position of the robotic system may be received from a remote operator computing device which sends a digital signal to the control system of the robotic system. For instance, the remote operator computing device may include a graphical user interface with a selectable option (e.g., a button or menu item) to relinquish control of the robotic system to the local automated system to complete pickup of an object. In some examples, the user interface may also enable communication of other types of information to include in the instructions, such as identification of the object (e.g., by clicking or selecting the object on a screen) and/or what point on the object to use as a pickup point.

In further examples, the target position of the robotic system may instead be received from a remote automated system. For instance, the instructions could be received from a global control system of a number of robotic systems operating within the environment. In such examples, the global control system may control the robotic system to navigate close to an object (e.g., using a global map of the environment) to be picked up before transferring control to the control system for automated final device approach and object pickup.

At block 404, the method 400 includes operating, by the control system of the robotic system, a first wheel and a second wheel of the robotic system to cause the robotic system to navigate to the target position while maintaining balance. Each wheel of the first wheel and the second wheel may be configured similar to the drive system 300 described above in relation to FIGS. 3A-3F. As such, each wheel may include a contact surface and a motor coupled to a rotatable component. As described above, the motor is configured to rotate the rotatable component. The rotatable component is frictionally engaged with the contact surface such that a rotation of the rotatable component is translated to a rotation of the first wheel or a rotation of the second wheel. In one example, the control system may be configured to control the first wheel and the second wheel independently of one another.

In addition, method 400 may further include receiving, by the robotic system from a first encoder coupled to (i) the motor of the first wheel and/or (ii) the first wheel itself, data indicative of motion and orientation of the first wheel. The method 400 may further include receiving, by the robotic system from a second encoder coupled to (i) the motor of the second wheel and/or (ii) the second wheel itself, data indicative of motion and orientation of the second wheel. In such an example, operating the first wheel and the second wheel of the robotic system to cause the device to navigate to the target position is based on the data received from the first encoder and the second encoder. In these examples, the first encoder and/or the second encoder may provide the data indicative of the orientations of the motor of the first wheel and/or the motor of the second wheel without the robotic system rotating a given wheel until the signal (e.g., index pulse) is received from the first encoder and/or the second encoder. Moreover, in some examples, the robotic system may be configured to determine a speed of a given motor based on the data provided by the first encoder and/or the second encoder.

In yet another example, the first encoder and/or the second encoder is configured to provide a signal indicative of the rotatable component of the motor slipping with respect to the contact surface, and wherein the controller is configured to adjust an odometry of the robotic system based on the signal. In such an example, the first encoder and/or the second encoder may be coupled to the first wheel and/or the second wheel. In such an example, the first encoder and/or the second encoder may provide an estimator of slip based on the expected dynamics of the system based on the input torque. The system may then compare the expected dynamics of the system based on the input torque with the actual wheel motion detected by the first encoder and/or the second encoder. If there is no difference in the comparison, then no corrective action may be required. However, if there is a difference between the expected dynamics and the actual detected wheel motion, slipping of the rotatable component with respect to the wheel may have occurred, and the controller may be configured to adjust an odometry of the robotic system accordingly to correct for such slipping.

In another implementation, method 400 may further include the steps of (i) determining a position of a center of mass of the robotic system, (ii) determining a position of the first wheel and the second wheel of the robotic system, (iii) determining that the position of the center of mass of the robotic system is outside of a polygon defined by the determined position of the first wheel and the second wheel, and (iv) adjusting a rotational speed of the rotatable component of the motor of at least one of the first wheel and the second wheel such that the center of mass of the robotic system is moved inside of the polygon. These steps may be operable by the control system to maintain the balance of the robotic system.

V. CONCLUSION

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

We claim:

1. A robotic system comprising:
a body;
one or more sensors;
a first wheel and a second wheel coupled to the body, wherein both the first wheel and the second wheel are configured to rotate about a first axis, and wherein each of the first wheel and the second wheel comprise:
an outermost diameter configured to contact a ground surface in an environment of the robotic system; and
a motor coupled to a rotatable component, wherein the motor is configured to rotate the rotatable component about a second axis, and wherein the rotatable component is frictionally engaged with the outermost diameter such that (i) a rotation of the rotatable component about the second axis is translated to a rotation of the wheel about the first axis and (ii) a gear ratio of the wheel to the rotatable component is defined based on a size of the outermost diameter relative to a size of the rotatable component; and
a controller that operates the motor of the first wheel and the motor of the second wheel to cause the robotic system to maintain balance and navigate within the environment based on data received from the one or more sensors.

2. The robotic system of claim 1, wherein one or more of the outermost diameter of the first wheel, the outermost diameter of the second wheel, the rotatable component of the motor of the first wheel, and the rotatable component of the motor of the second wheel includes a rubber material.

3. The robotic system of claim 1, wherein the first axis of the first wheel is parallel to the second axis of the first wheel, and wherein the first axis of the second wheel is parallel to the second axis of the second wheel.

4. The robotic system of claim 1, wherein the rotatable component of the first wheel and the rotatable component of the second wheel comprises a motor shaft.

5. The robotic system of claim 1, wherein the rotatable component of the first wheel and the rotatable component of the second wheel comprises a gear.

6. The robotic system of claim 1, wherein the gear ratio of the first wheel to the rotatable component of the motor of the first wheel is between 10:1 and 30:1, and wherein the gear ratio of the second wheel to the rotatable component of the motor of the second wheel is between 10:1 and 30:1.

7. The robotic system of claim 1, wherein the controller maintaining the balance of the robotic system comprises:
determining a position of a center of mass of the robotic system;
determining a first contact point of the first wheel of the robotic system on a ground surface and a second contact point of the second wheel of the robotic system on the ground surface;
determining a distance from a projection of the center of mass onto the ground surface to a line defined by the first contact point and the second contact point; and
adjusting a rotational speed of the rotatable component of the motor of at least one of the first wheel or the second wheel such that a velocity of at least one of the first wheel or the second wheel is driven to a given target.

8. The robotic system of claim 1, further comprising: a first encoder coupled to the motor of the first wheel to provide data indicative of motion and orientation of the first wheel, wherein the controller is configured to identify the motion of the first wheel based on the data provided by the first encoder; and a second encoder coupled to the motor of the second wheel to provide data indicative of motion and orientation of the second wheel, wherein the controller is configured to identify the motion of the second wheel based on the data provided by the second encoder.

9. The robotic system of claim 8, wherein the first encoder is configured to provide a first signal indicative of the motor of the first wheel being at a particular orientation, wherein the controller is configured to cause the rotatable component of the motor of the first wheel to rotate the first wheel until the first encoder provides the first signal, wherein the second encoder is configured to provide a second signal indicative of the motor of the second wheel being at a particular orientation, and wherein the controller is configured to cause the rotatable component of the motor of the second wheel to rotate the second wheel until the second encoder provides the second signal.

10. The robotic system of claim 8, wherein the wherein the controller is configured to determine, based on the data from the first encoder, a first speed of the motor of the first wheel responsive to the controller causing the rotatable component of the motor of the first wheel to rotate the first wheel, wherein the controller is configured to identify the motion of the first wheel based also on the determined first speed, wherein the controller is configured to determine, based on the data from the second encoder, a second speed of the motor of the second wheel responsive to the controller causing the rotatable component of the motor of the second wheel to rotate the second wheel, and wherein the controller is configured to identify the motion of the second wheel based also on the determined second speed.

11. The robotic system of claim 8, wherein the first encoder is configured to provide a first signal indicative of the rotatable component of the motor of the first wheel slipping with respect to the outermost diameter of the first wheel, wherein the controller is configured to adjust an odometry of the robotic system based on the first signal, wherein the second encoder is configured to provide a second signal indicative of the rotatable component of the motor of the second wheel slipping with respect to the outermost diameter of the second wheel, and wherein the controller is configured to adjust an odometry of the robotic system based on the second signal.

12. A method comprising:
  determining, by the controller of the robotic system of claim 1, a target position of the robotic system; and
  operating, by the controller of the robotic system, the first wheel and the second wheel of the robotic system to cause the robotic system to navigate to the target position while maintaining balance.

13. The method of claim 12, wherein the gear ratio of the first wheel to the rotatable component of the motor of the first wheel is between 10:1 and 30:1, and wherein the gear ratio of the second wheel to the rotatable component of the motor of the second wheel is between 10:1 and 30:1.

14. The method of claim 12, wherein the controller is configured to control the first wheel and the second wheel independently of one another.

15. The method of claim 12, wherein the controller maintaining the balance of the robotic system comprises:
  determining a position of a center of mass of the robotic system;
  determining a first contact point of the first wheel of the robotic system on a ground surface and a second contact point of the second wheel of the robotic system on the ground surface;
  determining a distance from a projection of the center of mass onto the ground surface to a line defined by the first contact point and the second contact point; and
  adjusting a rotational speed of the rotatable component of the motor of at least one of the first wheel or the second wheel such that a velocity of at least one of the first wheel or the second wheel is driven to a given target.

* * * * *